United States Patent [19]

Erlichman

[11] 4,200,379
[45] Apr. 29, 1980

[54] EXPOSURE CONTROL SYSTEM INCLUDING BLADE SENSING FOLLOW FOCUS AND TRIM ARRANGEMENT

[75] Inventor: Irving Erlichman, Wayland, Mass.

[73] Assignee: Polaroid Corporation, Cambridge, Mass.

[21] Appl. No.: 930,029

[22] Filed: Aug. 1, 1978

[51] Int. Cl.² .................... G03B 3/00; G03B 7/14; G03B 9/02
[52] U.S. Cl. .................... 354/196; 354/27; 354/149; 354/271
[58] Field of Search .................... 354/26–30, 354/34, 42, 59, 139, 149, 196, 230, 47, 43, 44, 270, 271, 247, 228

[56] References Cited

U.S. PATENT DOCUMENTS

| 3,433,144 | 3/1969 | Ivister | 354/139 |
| 3,464,332 | 9/1969 | Davison et al. | 354/27 |
| 3,832,721 | 8/1974 | Erlichman | 354/28 X |
| 3,928,859 | 12/1975 | Peterson | 354/27 |
| 3,950,766 | 4/1976 | Erlichman et al. | 354/29 |
| 3,977,012 | 8/1976 | Erlichman | 354/29 |
| 4,007,468 | 2/1977 | Blinow et al. | 354/59 |

Primary Examiner—L. T. Hix
Assistant Examiner—William B. Perkey
Attorney, Agent, or Firm—John S. Vale

[57] ABSTRACT

An improved exposure control system configured for automatic operation in both the ambient light and flash illumination modes of operation and including a pair of displaceably mounted shutter-aperture blades, a blade position sensor operative to detect a blade position indicator on one of the blades, a follow focus system operable in the flash mode for moving at least an element of the sensor along a first sensor path of travel and a trim control device being operative in the flash mode for moving the sensor element along a second sensor path of travel that intersects and is tranversely disposed with respect to the first path. The sensor provides an output signal in response to sensing the blade indicator for temporarily interrupting blade displacement, incidental to flash firing, at a selected aperture value in accordance with the position of the sensor element determined by the combined follow focus and trim control inputs.

9 Claims, 9 Drawing Figures

EXPOSURE CONTROL SYSTEM INCLUDING BLADE SENSING FOLLOW FOCUS AND TRIM ARRANGEMENT

BACKGROUND OF THE INVENTION

1. Field of the Invention

The present invention relates to the field of photography and, more specifically, to automatic exposure control systems of the type including a follow focus mechanism for selecting scene range dependent exposure aperture values for the flash illumination mode of operation and an aperture trim control mechanism for making fine adjustments to the follow focus selected aperture value.

2. Description of the Prior Art

The present invention is directed to improvements in an automatic exposure control system of the general type disclosed and claimed in U.S. Pat. No. 3,950,766 issued to Irving Erlichman et al on Apr. 13, 1976 and being commonly assigned with the present application.

The above-noted exposure control system operates automatically in both the ambient light and flash illumination modes of operation. Because of its simplicity of construction, relatively small physical size and a design which facilitates assembly by automatic machines, it may be produced economically and it is compatible for use in compact automated cameras.

The exposure control system is characterized by a thin two bladed shutter-aperture mechanism in which the blades are reciprocally driven simultaneously in opposite directions, between first and second terminal positions, for respectively blocking and unblocking the camera's optical path between the variable focus objective lens and the film at the focal plane. As the blades are driven toward the unblocking position, complementary apertures in the two blades are moved relative to one another and are progressively brought into registration to define a progressively changing exposure aperture over the optical path through which image bearing light from the scene is transmitted to a film unit at the focal plane.

In a preferred embodiment the two blades are coupled directly to a reversible stepper motor which is energized with a first train of pulse signals to drive the motor in a direction to open the shutter-aperture blades and is thereafter energized with a second train of pulse signals to drive the blades to the closed or blocking position.

In the ambient light mode of operation, the exposure control system operates under the control of a scene light sensing and integrating circuit. That is, in response to actuating a cycle start switch the stepper motor is energized and the blades are driven stepwise toward the unblocking position causing the exposure aperture to progressively increase in size with each step. While the blades are being so driven, the light sensing circuit integrates the sensed scene light intensity and at a predetermined voltage level provides a trigger signal which causes the pulse signals to the stepper motor to be reversed in pole exciting sequence thereby reversing the stepper motor which drives the blades back to the blocking position to terminate the exposure interval.

In the flash illumination mode the system functions in a somewhat different manner. Because the duration and the light intensity of the flash source are known parameters, the system is designed to operate in a follow focus mode. That is, exposure aperture value is preselected in proportion to scene range or distance from the camera and the aperture is set automatically in response to focusing the objective lens.

The disclosed follow-focus system includes a blade position sensor or electrical switch component that is mounted for movement along a sensor path that is substantially parallel to the path of travel of at least one of the two shutter aperture blades. Coupled to the camera's lens focusing wheel in cam follower relation, a follow-focus linkage moves the switch component to a predetermined location on the sensor path that corresponds to a blade position wherein the selected exposure aperture is in accordance with the scene range.

In operation, the start switch is actuated and the stepper motor is energized with the first train of pulse signals to drive the blades from the blocking position toward the unblocking position. At the preselected aperture value, the one blade engages and actuates the switch member which forms part of a control system. Upon switch actuation the stepper motor is automatically stopped or deenergized thereby holding the blades in the position defining the range selected aperture. The flash source is fired to expose the film unit and in response to the firing a signal is provided which causes the stepper motor to be energized with the second pulse train signal to drive the blades to the closed position.

Although the automatic exposure control disclosed in the previously noted U.S. Pat. No. 3,950,766 functions in a satisfactorily manner it does have a limitation in that the programmed exposure response of the system cannot be varied or trimmed by the operator to more closely match the exposure response to the sensitometric characteristics of the film or to exert personal control over the exposure by adjusting for intentional underexposure or overexposure to add a creative touch to the photograph or to make the proper adjustments for scene lighting conditions that depart significantly from the "average" conditions for which the exposure control system is preprogrammed.

Trim controls for making fine adjustments in the exposure response of such automatic control systems are, of course, well known in the prior art.

In general, exposure trim for the ambient light operation is provided by adjusting the apparent response of the light sensing and integrating circuit to change exposure interval. The most common way of doing this is to pivotally mount a variable neutral density filter wedge in front of the light circuit's photocell which the operator sets manually before initiating the film exposure operation. The follow focus systems for flash mode exposure generally operate in the exposure aperture selection mode whereby the blades are momentarily stopped at the selected maximum scene range related exposure aperture at or just before the flash fire phase. Commonly flash mode trim is accomplished by a trim control that is effective to vary the position (and thereby the exposure aperture size) at which the blades are stopped in preparation for flash fire.

U.S. Pat. Nos. 3,952,312 and 4,007,468, both commonly assigned with the present application, are representative of automatic exposure systems with trim controls for use with twin reciprocally driven shutter-aperture blades. In the ambient light mode trim is provided optically by means of an adjustable neutral density filter wedge in front of the photocell. For flash operation the follow focus system includes a blade stop pin that is moved into the path of travel of at least one of the blades at a position related to focus distance. Trim is provided by a manually operable linkage that moves the pin position independently of the pin positioning controlled by the follow focus device for optionally varying or trimming the follow focus selected aperture value. While both of the systems function satisfactorily, the follow focus device and trim mechanism are somewhat complex mechanically and tend to be relatively expensive to manufacture. For example, in the previously noted U.S. Pat. No. 3,952,312 the follow focus system includes a separate solenoid and stop pin linkage for moving the exposure aperture setting stop pin into and out of the blade's path of travel for flash illumination and ambient light modes respectively. In the previously noted U.S. Pat. No. 4,007,468 the follow focus system employs a spring biased mechanical linkage coupled between a blade stop pin and the flash socket such that the linkage moves the pin into the blade path when a flash source is inserted into the socket and moves it out of the blade path when the flash source is removed therefrom.

U.S. Pat. No. 3,433,144, commonly assigned with the present application, discloses an automatic exposure control system having an exposure aperture selecting follow focus system wherein an electrical switch means for shutter operation and flash fire is movable along a first sensor path of travel in response to lens focusing for aperture selection. Aperture trim is provided by a trim control which operates independently of the follow focus device and is effective to move the switch means along a second path disposed in substantially transverse intersecting relation to the first sensor path. The effective maximum exposure aperture is set or determined by the position of the switch means along both the first and second path. That is the location of the switch means can be described in a two coordinate system which determines the size of the maximum exposure aperture selected by the two independent inputs of the follow focus system and the trim control.

One inherent disadvantage of the exposure control system disclosed in U.S. Pat. No. 3,433,144 is that the two coordinate positioning of the shutter actuating and flash fire switch means is remote in location from the aperture setting blades and the switch means position is an indirect measure of the actual exposure aperture defined by the blades. This device employs a separate shutter and aperture defining blades. The pair of aperture defining blades are coupled to a pivoted shutter actuator link. As the link is progressively displaced from its normal starting position toward a terminal position, the link drives the two blades relative to each other to define an exposure aperture that progressively increases in size. One terminal or contact of the switch means is mounted on the actuating link. The other contact is mounted for movement relative to the actuator link in response to movement of the lens focusing device and trim control.

When the actuator link is depressed, it travels about its pivot point and the one switch contact thereon engages the other switch contact to close a switch which electrically trips the separate shutter blades and fires the flash.

The engagement of the switch means is an accurate measure of the displacement of the actuator link. But, it is only an indirect measure of exposure aperture size because of the coupling between the actuator link and the exposure aperture defining blade. Thus in order to prevent significant deviations of aperture size from camera to camera all of the parts making up the actuator link, aperture blades, switch means and the mounting for the same must be manufactured to very close tolerances and assembled very carefully thereby making such a system relatively costly to produce.

Therefore, it is an object of the present invention to provide an automatic exposure control system for use in a photographic camera and having a follow focus mechanism and exposure aperture trim control that is simple in construction and relatively easy to manufacture, assemble and test.

It is another object of the invention to provide such a system which includes a blade mechanism including at least one blade member mounted for movement between positions blocking and unblocking the camera's optical path and in which the blade defines progressively changing aperture values and the follow focus and trim control provide a direct measure of the blade position to establish a preselected aperture value.

It is yet another object of the invention to provide such an exposure control system wherein the follow focus and trim controls are actuable to move a blade sensor independently along mutually intersecting transverse paths and the blade member has an indicator thereon that cooperates directly with the sensor to accurately indicate blade position associated with a preselected aperture value.

SUMMARY OF THE INVENTION

The present invention provides an automatic exposure control system for regulating the transmission of image-bearing light rays from a scene to be photographed along an optical path to a photographic film unit adapted to be located at a given focal plane. The system functions automatically in both ambient light and flash illumination modes of operation and includes trim controls for modifying the exposure response of the system to adapt it to particular scene lighting conditions.

In a preferred embodiment the exposure control system includes a pair of thin shutter-aperture blades that are reciprocally driven by reversible drive means between positions blocking and unblocking the optical path. As the blades are displaced between the blocking and unblocking positions they cooperate to define progressively varying exposure aperture values over the optical path that are in accordance with the position of the blades along a blade path of travel. For flash mode operation the exposure control system includes a follow focus system that is actuable for moving a blade position sensor along a first sensor path of travel that is substantially parallel to the blade path of travel in accordance with the lens distance setting and a trim control device that is actuable to move the same sensor along a second sensor path that intersects with and is substantially transverse to the first sensor path. The trim control device operates independently of the follow focus system and the selected position of the sensor along the blade path of travel (and therefore the selected exposure aperture size or value) is defined by the combined positional inputs of both the follow focus system and the trim control device. At least one of the blades includes an indicator thereon that provides a blade position indication for the sensor. In the illustrated embodiment the sensor includes at least one contact of an electrical switch and the indicator includes an edge of the one blade that travels over the first and second sensor paths as the blade is displaced. The blade edge is disposed at an oblique angle with respect to the first and second sensor paths so that in effect it provides a two coordinate reading of blade position for the sensor switch.

In the illustrated embodiment the reversible blade drive means includes an electrical stepper motor and the switch sensor provides a given output signal when the oblique edge of the blade is located in a predetermined vicinity of the sensor switch contact, to cause the stepper motor to at least temporarily stop driving the blades any further towards the unblocking position when the preselected scene range related exposure aperture value has been attained. Following the stepping drive of the blades, the flash source is fired and then a reverse train of pulse signals is fed to the stepper motor to drive the blades to the blocking or closed position.

Advantageously, the follow focus system and trim contact device are of simple construction and the sensor "reads" the blade position directly from the indicator on the blade to provide the more accurate direct reading of blade position (and therefore exposure aperture size or value) rather than the previously described indirect reading measurement which depends on the use of expensive close tolerance piece parts for accuracy.

BRIEF DESCRIPTION OF THE DRAWINGS

For a fuller understanding of the nature and objects of the present invention, reference should be made to the following detailed description taken in connection with the accompanying drawings wherein.

DESCRIPTION OF THE PREFERRED EMBODIMENT

Figure 1:
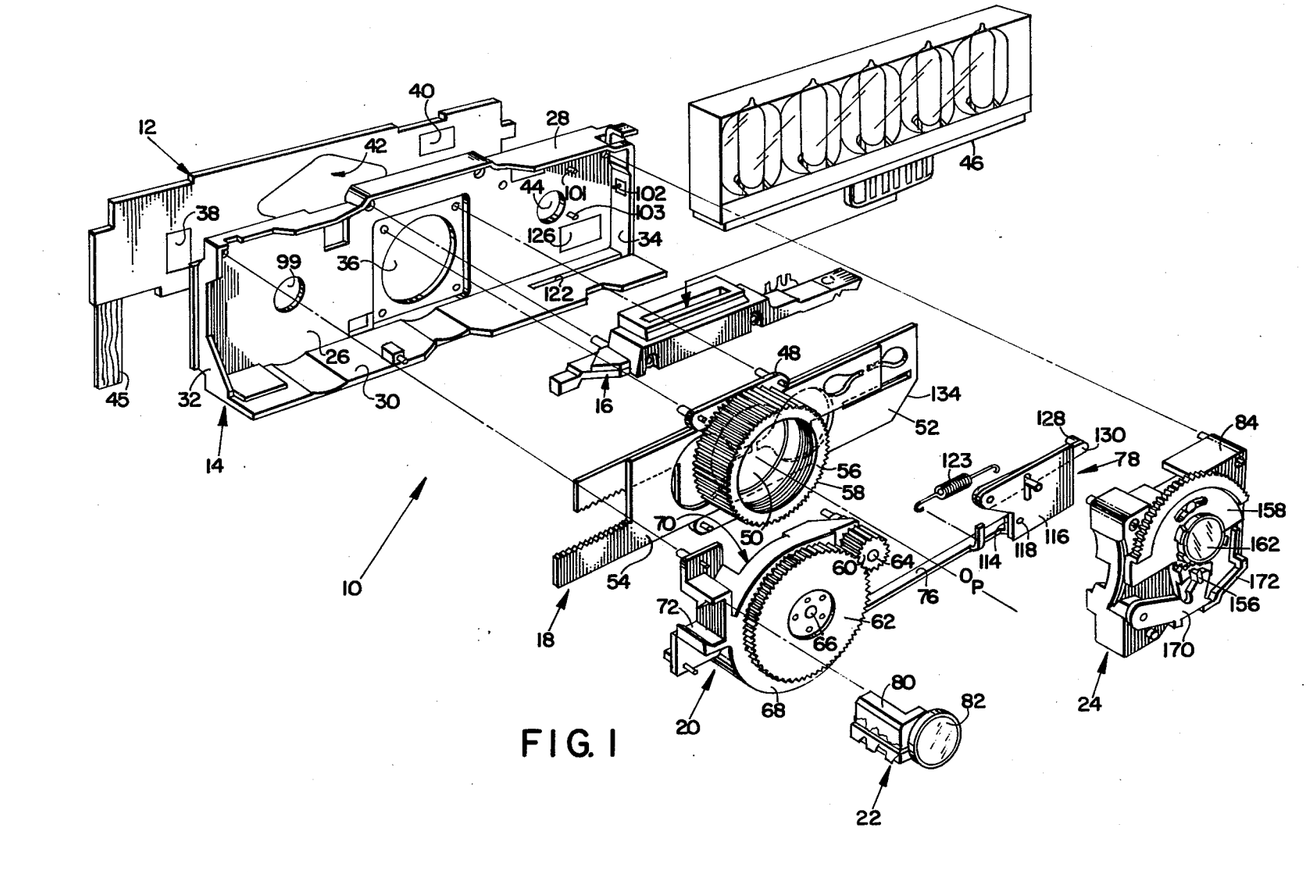
FIG. 1 is a perspective view, shown in exploded fashion, of an exposure control system embodying the present invention and illustrating the structure and position of major component assemblies thereof.

FIG. 1 of the drawings shows, in an exploded view for visual clarity, the major component assemblies of an automatic exposure control system 10 for use in a photographic apparatus, such as a camera, for regulating the transmission of image-bearing light rays from a scene to be photographed along an optical path to a photographic film unit located at a given focal plane of the camera.

The major component assemblies include electronic circuit mounting board 12; a system mounting and support member 14; a flash socket assembly 16; an objective lens and shutter-aperture blade assembly 18; a stepper motor, lens focusing and follow focus assembly 20; a camera cycle start button switch assembly 22; and an exposure trim control assembly 24.

The exposure control system 10 is configured to function automatically in both ambient light and flash illumination modes of operation and includes a trim control system which is operative for making fine adjustments (one or more full stops) in the preprogrammed exposure response of system 10 to more closely match the sensitometric characteristics of the film used therewith or to allow the operator to intentionally lighten or darken the photographic print by adjusting the system 10 for overexposure or underexposure.

The support member 14 includes a rear wall 26, a top wall 28, a bottom wall 30 and side walls 32 and 34 and serves as the major support for the component assemblies of system 10.

As is apparent from FIG. 1, the modular construction of the component assemblies and the configuration of support member 14 facilitates the assembly of system 10 as indicated by the broken lines showing the mounting position of the various component assemblies. Those skilled in the art will readily recognize that system 10, as depicted, is especially well suited for assembly by automatic assembly machines because the modular component assemblies may be attached to support member 14 in a logical sequence.

The support member 14 has a circular exposure opening 36 in rear wall 26 through which image-carrying light rays from a scene are transmitted along the system's optical path OP, the central axis of which coincides with the center of exposure opening 36.

The electronic circuit mounting board 12 mounts a plurality of electronic control circuits and networks (only one of which is shown in FIG. 1 as an integrated circuit package 380) and a photosensitive photocell element 40 forming part of a scene light sensing and integrating circuit, all of which will be described later in connection with FIG. 8. Mounting board 12 is secured to the rear side of support member 14 and has a central opening 42 therein that is coextensive and aligned with the exposure opening 36 to allow passage of image bearing light therethrough to a film unit at the camera's focal plane (neither of which is shown). When board 12 is attached to support member 14, the photocell element 40 is aligned with an opening 44 in rear wall 26 through which scene light passes to impinge upon photocell element 40 to control exposure interval as will be described later. The electrical circuits and networks on board 12 are connected to the appropriate camera components by means of a multi-lead connector as suggested at 45.

The illustrated flash socket assembly 16 attaches to support member 14 over opening 36 and is configured to receive a multi-lamp flash unit assembly shown at 46. Socket 16 includes appropriate internal wiring for electrically coupling the flash socket terminals to later-to-be-described lighting mode selector and flash firing circuits mounted on board 12. It will be noted that system 10 may be alternately configured to include a socket 16 for receiving an electronic flash or strobe unit rather than the illustrated socket 16 for the multi-lamp flash unit 46 without departing from the scope of the present invention.

Assembly 18 includes a component mounting member 48 which mounts an adjustable focus objective lens 50, mounts and guides the movement of a pair of thin shutter-aperture blades 52 and 54 and is configured to be secured to support member back wall 26 over and in alignment with exposure aperture 36, as indicated by the broken lines, to located blades 52 and 54 and lens 50 operative relation with the optical path OP.

The variable focus objective lens 50 is displaced axially along path OP for focusing in response to rotation of the lens barrel 56 relative to mounting member 48. The lens barrel 56 includes externally formed gear teeth 58 which are in mesh with an idler gear 60 which is also in mesh with a focus adjusting wheel 62 having gear teeth about its periphery. Both gear 60 and focus adjusting wheel 62 are rotatably mounted on the later-to-be-described assembly 20 by means of studs 64 and 66 respectively. When system 10 is assembled and enclosed by a shutter housing section of the camera (not shown), the top peripheral edge of wheel 62 projects through an opening in the shutter housing thereby providing access for the operator to manually engage and rotate wheel 62 thereby in turn rotating the lens barrel 56, through idler 60, for axial displacement.

In addition to gear 60 and focus adjusting wheel 62, assembly 20 includes: a component mounting member 68; mounting studs 64 and 66; a compact reversible electric stepping motor 70 (see FIGS. 4 and 8) for driving blades 52 and 54 and being supported within mounting member 68 behind wheel 62; a switch receiving and supporting socket 72 for receiving the camera cycle start button switch 22; a follow focus linkage system comprising links 74 and 76 (see FIG. 4); and a blade position sensor switch actuator assembly 78 all of which will be described in detail hereinafter. Assembly 20 is mounted on support member 14 by the attachment of mounting member 68 to wall 26 of member 14 at a position indicated by the broken location lines.

Switch assembly 22 includes a normally open electrical switch (not shown), in switch housing 80, which is actuable by pressing button 82 to close the switch and initiate a cycle of camera operation. Switch assembly 22 is mounted on mounting member 68 by inserting housing 80 into receiving socket 72.

The later-to-be-described exposure trim control assembly 24 with reference to FIG. 3 includes a component mounting member 84 which is positioned in front of and in operative coupled relation to blade position sensor assembly 78 and is secured to rear wall 26 of member 14 in the position indicated by the broken location lines to mount trim control assembly 24 on support member 14.

Figure 2:
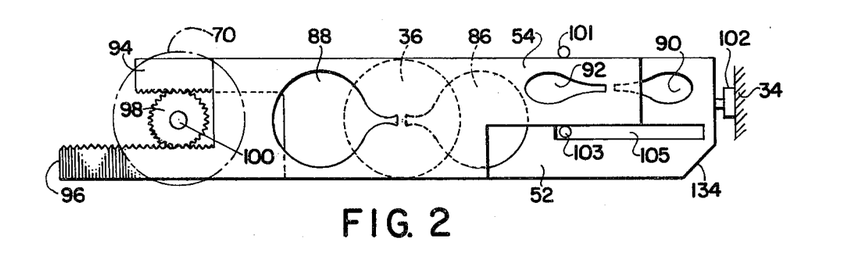
FIG. 2 is a front elevational view of a pair of shutter-aperture blades shown in operative relation with a blade driving stepping motor.
Figure 3:
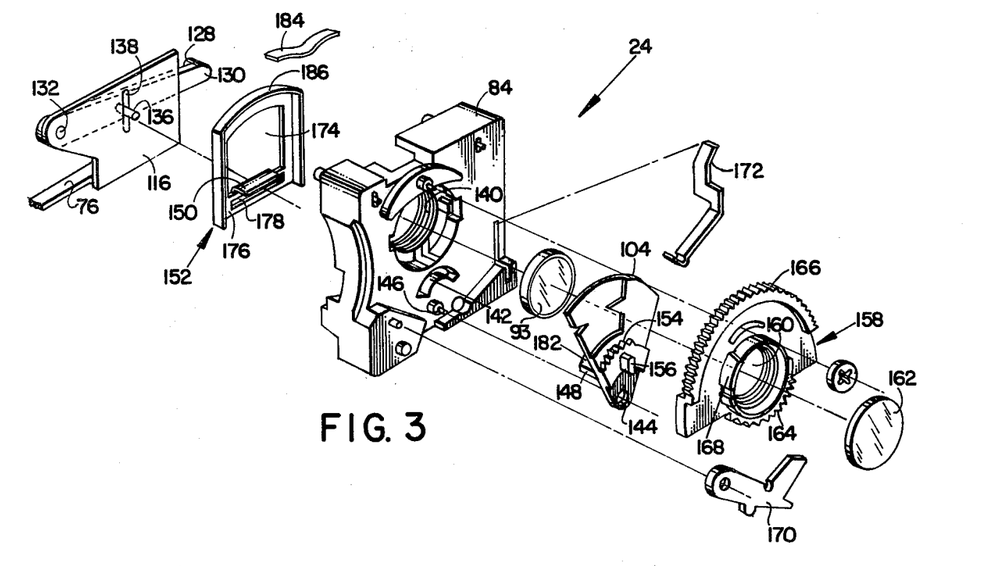
FIG. 3 is an exploded perspective view of a trim control mechanism shown in its assembled configuration in FIG. 1.

With reference to FIGS. 1, 2 and 3, the shutter aperture blades 52 and 54 are thin elongated members preferably formed of plastic or any other suitable electrically insulating material. The blades 52 and 54 are formed with tapered apertures or primary openings 86 and 88 therein respectively which are shown in non-overlapping relation when the blades are in the closed position of FIG. 2 blocking the optical path OP to prevent light rays transmitted by lens 50 to be transmitted through openings 36 and 42 and are adapted to be moved to an unblocking position (not shown) in response to displacing blades 52 and 54 in opposite directions wherein apertures 86 and 88 fully overlap or are in full registration to form a maximum size or full exposure aperture over the optical path. Due to the tapered shape of the apertures 86 and 88, they cooperate to define progressively changing exposure aperture values over the optical path OP as the blades are progressively displaced between the blocking and unblocking positions.

Blades 52 and 54 also include secondary tapered apertures 90 and 92 therein, respectively, located adjacent the right-hand end of blades 52 and 54 (as viewed in FIG. 2) which do not overlap, when blades 52 and 54 are in the closed position, so as to block an optical path for scene light provided by a later-to-be-described field lens 93 in assembly 24 (see FIG.) through opening 44 in wall 26 to the photocell element 40 mounted in alignment therewith on board 12 and in response to displacement of blades 50 and 52 in opposite directions on which fully overlap when blades 52 and 54 are in the unblocking position to form a maximum size light transmission aperture over the photocell optical path. As blades 52 and 54 are displaced between the blocking and unblocking positions apertures 90 and 92 cooperate to define a progressively varying photocell light transmission aperture which is directly related in size to the size of the exposure aperture defined by apertures 86 and 88 for a given position of the blades 52 and 54 along the path of blade travel.

The blades 52 and 54 are slidably mounted in guide tracks (not shown) on mounting member 48, with blade 54 in front of blade 52, for simultaneous reciprocating movement in opposite direction along a blade path of travel disposed in adjacent parallel relation to the plane of wall 26 of support member 14 between the previously described unblocking position and the illustrated blocking position. The blade path of travel extends longitudinally along the length of blades 52 and 54 in the directions of their relative reciprocating movement (horizontal in FIG. 2) and is as wide as the widest lateral dimension (measured vertically in FIG. 2) of the blades 52 and 54.

The blades 52 and 54 also included opposed elongated toothed rack extensions 94 and 96, respectively, extending outwardly in the longitudinal direction from the left-hand end (as viewed in FIG. 2) of the main body portions of blades 52 and 54. The opposed rack extensions 94 and 96 are both in mesh with pinion gear 98 fixedly secured to the output drive shaft 100 of the reversible blade driver stepper motor 70 mounted on support member 68 of assembly 20. As shown in FIG. 1, support member 14 includes an aperture 99 in wall 26 through which the outboard end of pinion gear 98 extends, at least partially, to insure that gear 98 is maintained in operative meshed engagement with the rack extensions 94 and 96 which are located very close to the interior surface of wall 26. Also, blade guide pins 101 and 103 are mounted on wall 26 to help guide the blades 52 and 54. Pin 101 is positioned over the top edge of blades 52 and 54 and pin 103 extends through an elongated horizontal slot 105 in blade 52.

As best shown in FIG. 2 wherein the blades 52 and 54 are shown in the closed, light blocking, first terminal position, rotation of the stepper motor shaft 100 and the pinion 98 thereon in a counterclockwise direction will cause blade 52 to be linearly driven to the left as viewed in FIG. 2 and blade 54 to be simultaneously driven in the opposite direction (to the right) along the blade path of travel to bring the apertures 86 and 88 into overlapping relation wherein they cooperate to define progressively larger exposure apertures over the optical path OP as the blades 52 and 54 are progressively advanced in the noted opposite directions from the first terminal position (blocking) toward the second terminal position (not shown) or unblocking position wherein apertures 86 and 88 cooperate to define the maximum or full exposure aperture or aperture value. In response to this blade movement, the secondary apertures 90 and 92 cooperate in a similar manner to define the corresponding configurations of the light transmission aperture over the optical path to photocell element 40. As will be set forth later, the motor 70 is adapted to be fed with a first train of electrical pulse signals to energize the motor 70 and rotate its output shaft 100 and gear 98 in a counterclockwise direction to drive blades 52 and 54 from the blocking position to the unblocking position to initiate an exposure interval and thereafter to be fed with a second train of electrical pulse signals to energize the motor 70 in the opposite directional sense to cause shaft 100 and pinion gear 98 to rotate in the clockwise direction to drive the blades 52 and 54 in the opposite direction from a selected exposure aperture value toward the blocking position to terminate the exposure interval.

For a more detailed description of stepper motor 70 and its interaction with blades 52 and 54, reference may be had to U.S. pat. No. 3,882,522 entitled "Non-Cocking Springless Shutter Developing Two Parameter Exposure Regulation" issued to Irving Erlichman on May 6, 1975 and being assigned in common with the present application.

Figure 4:
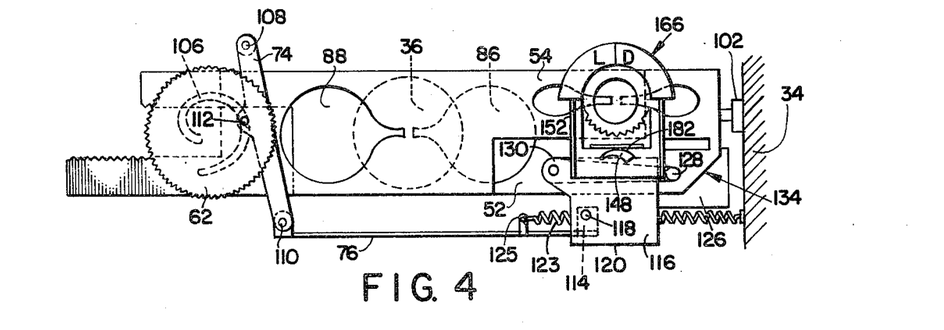
FIG. 4 is a front elevational view of the blades of FIG. 2 along with selected components of a follow focus system and a trim control mechanism with a blade position sensor switch actuator shown in its neutral trim position.

As best shown in FIGS. 1, 2 and 4, a switch unit 102, mounted on side wall 34 of support member 14 in the path of travel of blade 52, is actuated by the right-hand end of blade 52 when it reaches its closed or blocking position and thereby indicates the start position for shutter-aperture blade operation.

In the ambient light mode of operation, the exposure control system 10 operates under the control of a scene light sensing and integrating circuit formed in part by photocell element 40. Ambient light reflected from the scene to be photographed is focused by field lends 93 onto photocell element 40. As will be explained later with reference to FIG. 8, an exposure phase commences with the feeding of the first train of pulse signals to motor 70 which drives blades 52 and 54 in steps from the blocking position to the unblocking position so that apertures 86 and 88 define progressively larger exposure apertures over optical path OP. As the blades are driven open the photocell circuit integrates the light intensity value of scene light transmitted by lens 93, through the progressively larger transmission aperture defined by secondary apertures 90 and 92 to photocell element 40. Upon reaching a predetermined voltage, indicative of a predetermined exposure value, the light sensing and integrating circuit provides a trigger signal output which is utilized to terminate the first train of pulse signals to motor 70 and thereafter apply the second train of pulse signals thereto to reverse motor 70 which then drives blades 52 and 54 to the closed or blocking position.

In order to provide some adjustment in the preprogrammed exposure response of system 10 that is matched to the speed of the film being used therewith, the trim control assembly 24 includes an optical filter wedge 104 which is a neutral density filter that varies in density from one edge of the other. As will be explained in detail later, filter wedge 104 is mounted for movement on mounting member 84 for pivotal movement into and out of the optical path of scene light directed to photocell element 40. By selecting a particular density value to be in alignment with photocell element 40, the operator may vary the intensity of the scene light impinging thereon thereby adjusting the exposure response of system 10.

For a normal exposure the wedge 104 is set at its midpoint neutral or medium density. For a darker positive print, the wedge 104 is pivoted to locate a lower density portion in line with photocell element 40 thereby raising the intensity of scene light impinging thereupon and reducing the duration of the exposure interval. This means that the negative will be somewhat underexposed, yielding a darkened positive print. Conversely, a lighter photographic print is produced by moving a higher density portion of wedge 104 into alignment with photocell element 40 thereby increasing the exposure interval. A more detailed description of wedge 104 and its associated components of assembly 24 will appear later herein with reference to FIG. 3.

As noted above, in the ambient light mode the exposure is made through the progressively changing exposure aperture for an exposure interval determined by the light sensing circuit. Because the blades 52 and 54 are driven stepwise at a predetermined rate, the dominant variable exposure parameter is exposure interval for ambient light operation.

In the flash mode, the exposure control system 10 is configured for follow focus operation. Because the light intensity output and duration of the flash produced by flash unit 46 are known and it is well understood that the light intensity varies inversely to the square of the distance from the flash source to the scene, the exposure value can be quite adequately controlled by setting the blades 52 and 54 in a position wherein apertures 86 and 88 cooperate to define an exposure aperture or aperture value in accordance with the range of scenes. That is, if the scene or subject is relatively close to the camera mounted flash, then the scene illumination provided by the flash unit will be relatively bright or intense requiring a relatively small exposure aperture to produce a normal exposure. Conversely, if the scene range is relatively long so that lighting produced by the flash unit at the scene is less intense, then the blades 52 and 54 must be located at a position defining a relatively large exposure aperture.

In the illustrated embodiment of exposure control system 10 the light sensing and integrating circuit is bypassed in response to inserting flash unit 46 into socket assembly 16 and a circuit having a fixed time interval for producing the trigger signal is substituted therefore. The blades 52 and 54 are adapted to be driven from the blocking position towards the unblocking position and upon reaching a position along the blade path of travel wherein the exposure aperture defines a preselected exposure aperture value in accordance with scene range, the blades are stopped by deenergizing motor 70. Then the flash unit is fired to expose the film unit and the motor 70 is energized by the appropriate pulse signals to drive blades 52 and 54 to the closed position. However, it will be understood that the exposure control system may be configured for hybrid operation such as disclosed by commonly assigned U.S. Pat. No. 3,750,543 wherein the light sensing circuit remains in operation in parallel with the follow focus system thereby establishing a race condition between the two exposure terminating controls. It will be recognized that such a hybrid system extends the flexibility of the exposure control system in that it allows the system to operate in a combined ambient/flash mode for fill flash pictures and the like.

As in the previously noted U.S. Pat. No. 3,950,766, the following focus system of exposure control system 10 utilizes a sensor for detecting the position of at least one of the shutter aperture blades 52 and 54 along the blade path of travel. Because each position of the blade corresponds to a particular exposure aperture value, the aperture value can be defined in terms of the sensor location along a first sensor path of travel, disposed in substantially parallel relation to the blade path of travel, at which the sensor detects the one blade. By coupling the sensor for movement along its first path of travel in response to setting a scene range parameter, such as focusing objective lens 50, the sensor may be positioned at a preselected location at which the blades define a corresponding range related exposure aperture and the sensor detects the blade and provides an appropriate output signal for stopping the blades at the preselected exposure aperture. Following this the flash unit is fired and then the shutter aperture blades are driven to the closed position.

As best shown in FIGS. 1 and 4, assembly 20 includes the previously noted follow focus links 74 and 76 and the sensor switch actuator assembly 78 forming part of the blade position or location sensor means.

The follow focus system also includes a convoluted cam channel 106 disposed on the interior side of focus adjusting wheel 62 about its axial mounting stud 66. The first follow focus link 74 is pivotally mounted at its upper end to mounting member 68 by pin 108 and is pivotally coupled at its lower end to the left end (as viewed in FIG. 4) of the horizontally disposed second follow focus link 76 at pin 110. Mounted on a mid portion of link 74 is a cam follower pin 112 that extends into and rides in cam channel 106 thereby coupling the focus adjusting wheel 62 and link 74 in cam following relation.

Figure 7:
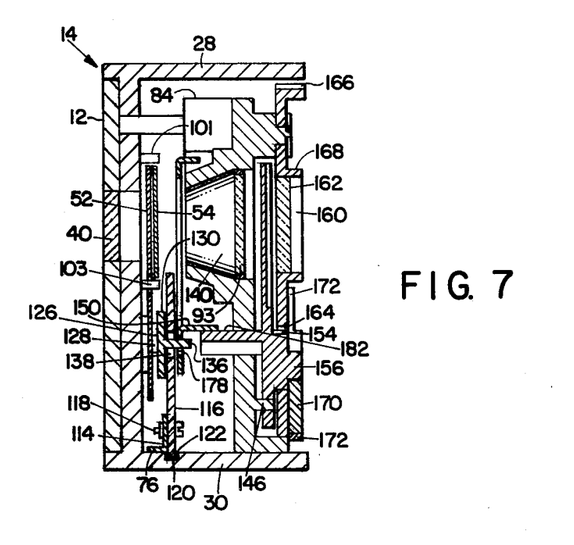
FIG. 7 is a cross-sectional view of selected components of the exposure control system shown in an assembled operative configuration.

The right-hand end of link 76 terminates in an upturned flange 114 which is utilized to couple this end of link 76 to a vertically disposed thin sensor actuator mounting and positioning plate 116 at pin 118. As will be explained later, plate 116 is mounted for longitudinal movement along a first sensor path of travel that is parallel to the blade path of travel and the lower edge 120 of plate 116 is adapted to extend into and ride along a longitudinally arranged guide channel 122 integrally formed in the bottom wall 30 of support member 14 for locating and guiding plate 116. As best shown in FIG. 7 plate 116 is mounted in adjacent parallel relation to shutter-aperture blades 52 and 54 for movement along the first sensor path of travel. Assembly 20 also includes a trim linkage balancing spring 123 having one end coupled to wall 34 and the opposite end coupled to flange 125 on link 76.

In the illustrated embodiment the blade position or location sensor includes an electrical switch 124 having one fixed contact 126 in the form of an elongated rectangular electrically conductive plate being fixedly secured to the interior surface of rear wall 26 of support member 14 below photocell aperture 44 in facing relation to movable plate 116 and a second contact 128 being movable with respect to contact 126 and being mounted at the free end of a switch actuator arm 130 that is pivotally coupled at its opposite end to the back side of plate 116 at pivot pin 132. As best shown in FIGS. 1, 3, 4, 5, 6 and 7, the switch actuating arm 130, which in cooperation with contact 128 serves as an actuating portion of sensor 124, is formed of a resilient material and is configured as a leaf spring. It is prestressed to provide a biasing force which normally urges contact 128 into electrical contact with switch contact 126. As best shown in FIG. 4 a portion of the electrically insulating blade 52 separates contacts 126 and 128 when the blades 52 and 54 are in the closed or light blocking position thereby maintaining switch 124 in its open or nonconducting state. As will be explained in detail later, when the blade 52 and 54 are driven from the closed position of FIGS. 2 and 3 toward the open position, the portion of blade 52 that separates contacts 126 and 128 will be displaced to the left (as viewed in FIGS. 2 and 4) and be pulled out from its contact separating position thereby allowing the spring biased contact 128 on arm 130 to make electrical contact with contact 126 to close or actuate switch 124. As will be apparent later in connection with FIG. 8 the closing of switch 124 will serve as an output signal which is fed to the electronic control system to deenergize motor 70 and thereby stop blades 52 and 54 at a preselected location along the blade path of travel wherein they define a preselected range proportional exposure aperture in preparation for flash firing.

With reference to FIGS. 1, 3 and 4, the switch actuator portion (arm 130 and contact 128) are configured to be moved along a first sensor path of travel, in response to focusing lens 50, that is substantially parallel to the blade path of travel and the coincidental directions of travel of blades 52 and 54. Movement of the actuator portion is, of course, provided by the motion of sensor actuator plate 116 along its longitudinal path through its linkage conncetion with the cam channel 106 on focus adjusting wheel 62. As best shown in FIGS. 2 and 4 the blade 52 includes indicator means in the form of the oblique edge portion 134 thereof which is disposed at an oblique angle (preferably approximately 45°) with respect to the blade path and direction of travel and the first and later-to-be-described second sensor path and directions of travel. The indicator means 134 provides an indication to the switch 124 when the blade 52 is located within a predetermined vicinity of sensor switch 124, or more precisely the actuator portion thereof so that switch 124 may close and provide its given output signal. In this instance the predetermined vicinity of blade 52 with respect to switch 124 is that location of blade 52 wherein the edge 134 is pulled out sufficiently from between contacts 128 and 126 to allow switch 124 to close.

The shape of the cam channel 106 is selected so that the position of the contact 128 along its first sensor path of travel, set by rotating focus adjusting wheel 62, is in accordance with a position of blades 52 and 54 along their path of blade travel that defines an exposure aperture in accordance with the distance at which the lens 50 is focused on the scene. The follow focus system provides first sensor positioning means for locating the sensor actuating means in a position, along a first path of sensor travel, that corresponds to a particular blade position which in turn corresponds to a particular exposure aperture value. In this instance the follow focus sets exposure aperture for a "normal" preprogrammed exposure.

In order to trim the flash mode exposure response of system 10, or more particularly adjust the set position of switch contact 128 with respect to indicator edge 134 and vary the selected exposure aperture, independently of the operation of the follow focus system, the contact 128 is adapted to be moved along a second sensor path of travel that intersects with and is substantially transversely disposed with respect to the first path in response to the user operating the trim control assembly 24 to cause arm 130 to pivot about pin 132.

As best shown in FIG. 3, the sensor actuator arm 130 has a pin 136, mounted on a midportion thereof, which extends through an elongated vertical slot 138 in plate 116 so that it projects forwardly of plate 116. Pin 136 serves as the means by which arm 130 is coupled to trim control assembly 23 for pivotal motion about pivot pin 132.

Trim control assembly 24 includes the component mounting member 84 which may be formed as a molded plastic block-like structure having integral central circular opening 140 therein adapted to be aligned with the light transmission optical path to photocell element 40 and an arcuate opening 142 located below opening 140.

Opening 140 is configured as a lens mount for receiving and supporting field lens 93 which is selected to match the objective lens 50 in that both have the same or similar fields of view and lens 93 projects an image of the scene to be photographed, or a selected portion thereof, onto photocell element 40.

The neutral density filter wedge 104 is a molded pie-shaped component having its variable density filter portion at the top thereof and including an opening 144 for receiving a mounting stud 146 on member 84 for pivotally mounting wedge 104 thereon, a rearwardly extending arcuate cam 148 that extends through arcuate opening 142 and engages a tab 150 of a later-to-be-described sensor coupling frame 152, an integrally molded arcuate convex toothed rack portion 154 and a forwardly extending tab 156.

The wedge 104 is adapted to be pivoted across the photocell optical path by means of a trim control adjusting wheel 158.

Wheel 158 is preferably a substantially semi-circular molded plastic part having a central aperture 160 for receiving and supporting a transparent photocell window 162 adapted to be located in alignment with lens 93, a lower toothed portion 164 which engages in operative mesh with the arcuate rack 154 on wedge 104, an upper peripheral portion 166 having integrally molded teeth and being configured to extend partially through an access slot in a camera shutter housing front cover (not shown) for the user to manually engage wheel 158 and rotate it to pivotally move wedge 104, and a forwardly extending integrally molded mounting collar 168 around aperture 160 which is adapted to be seated in telescoping fashion within an aligned aperture in the camera shutter housing (not shown) to mount wheel 158 for rotation about its axis relative to mount member 84. As best shown in FIGS. 1 and 3, trim control assembly 24 may also include a trim return cam 170 and its associated biasing spring 172 coupled to member 84 as shown in FIG. 1 and serving to automatically return wedge 104 and wheel 158 to a neutral trim position in response to pivoting cam 170. Such a trim return system may be actuated in response to folding a camera of the type shown in U.S. Pat. No. 3,792,649 and including a similar trim system.

The sensor coupling frame 152 is preferably formed as a stamped sheet metal piece part defining a frame-like member around its central opening 174 through which scene light from field lens 93 is transmitted along the photocell optical path.

Integrally formed in a lower wall section 176 of frame 152 is an elongated horizontally disposed slot 178 for receiving the pin 136 on actuator arm 130. Slot 178 is of sufficient length to allow arm 130 to be moved along its entire longitudinal first sensor path of travel without interference in response to displacement of plate 116 by the follow focus system.

The coupling frame 152 is mounted in a vertically disposed guide channel (not shown) on the back side of mounting member 84 for vertical displacement relative thereto with the previously noted forwardly projecting tab 150 located in cam follower engagement with the upper arcuate surface 182 of arcuate cam 148 on wedge filter 104. A leaf spring 184 is mounted on member 84 in bearing relation to the upper cross member 186 of frame 152 to provide a small downward biasing force on frame 152 and thereby maintain tab 150 in engagement with surface 182.

Figure 9:
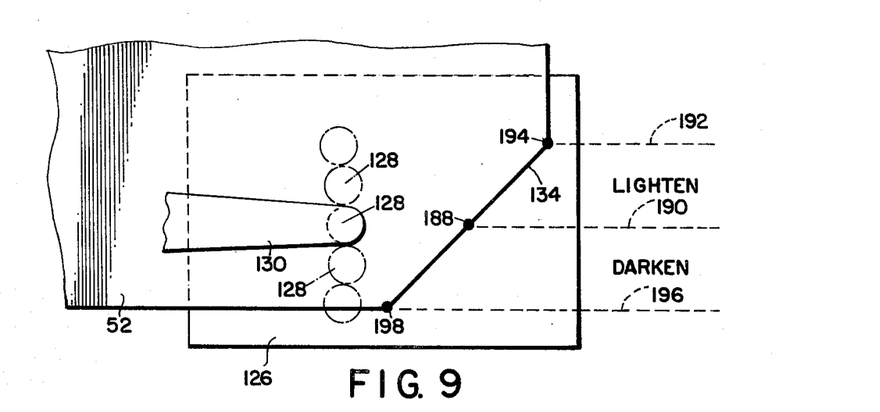
FIG. 9 is an enlarged diagrammatic representation of the oblique indicator edge of one of the shutter-aperture blades and the contact end of a sensor switch arm which interacts with the indicator.

As best shown in FIG. 4, when filter wedge 104 is set at its neutral or no trim position the cam 148 on wedge 104 locates the coupling frame 152 in a neutral or mid-range position which in turn locates arm 130 and contact 128 thereon is a substantially horizontal neutral position by means of the coupling between frame 152 and arm 130 provided by pin 136 in frame slot 178. When arm 130 is horizontally disposed in its neutral position the contact 128 is positioned on the first sensor path of travel (no trim) in alignment with the midpoint or neutral point 188 of the oblique 45° indicator edge 134. In FIG. 9 the neutral trim position is shown by a neutral trim horizontal construction line 190 which is parallel to the blade path of travel and the first sensor path of travel and passes through the center of movable contact 128 and the midpoint 188 of oblique indicator edge 134.

FIG. 4 shows focus adjusting wheel 62 positioned to focus lens 50 at approximately a midpoint of its focal range. In respect to this setting the follow focus system positions plate 116 along the first sensor path wherein the horizontally disposed sensor actuator arm 130 (zero or neutral trim) is located to position contact 128 on neutral trim line 190 at a predetermined distance from indicator midpoint 188 that corresponds to the appropriate range related exposure aperture that blades 52 and 54 will define when the blades are advanced along the blade path of travel the predetermined distance whereupon the indicator edge 134 is disengaged from contact 128 to allow contact 128 to engage contact 126 to close switch 124 and provide the output signal to interrupt the opening blade drive program incidental to flash firing.

Thus the follow focus sytem is actuable to move plate 116 in a horizontal direction and move contact 128 along the first sensor path to vary the distance between contact 128 and the midpoint 188 of edge 134. If the adjustment of the contact 128 is thought of as moving in a plane with a point therein being describable in terms of two grid coordinates (X, Y), the follow focus system input moves arm 130 and contact 128 thereon along the X-axis.

When the focus adjusting wheel 62 is rotated in a clockwise direction, the lens barrel 52 rotates in a clockwise direction to cause the lens 50 to move towards the focal plane to focus it on a scene that is further away from the camera than when lens 50 is set for mid-range focus. In response to this rotation, the pin 112 riding in cam channel 106 causes link 74 to pivot in a clockwise direction about pin 108 resulting in the movement of link 76 and plate 116 to the left thereby increasing the distance between contact 128 and indicator midpoint 188. The increase in this distance means that the blades 52 and 54 will have to move further along the blade path of travel before switch 124 is actuated by the pulling of blade 52 out of its insulating position between contacts 128 and 126 thereby setting a larger exposure aperture that is appropriate for the correspondingly longer subject distance. That is, in flash mode operation the exposure aperture must be increased as subject distance increases so as to maintain relatively constant exposure value because of the inverse square law reduction in per unit light intensity with increased subject distance.

Conversely, when focus adjusting wheel 62 is rotated in a counterclockwise direction to focus lens 50 on subjects closer to the camera than a mid-range subject or scene, link 74 is pivoted in a counterclockwise direction about pin 108 to move plate 116 and switch actuator arm 130 to the right thereby decreasing the distance from contact 128 to indicator midpoint 188 to provide the output signal at a smaller exposure aperture. That is, the blade 52 and 54 will travel a smaller distance and set a correspondingly smaller exposure aperture at the point that switch 124 is actuated.

Figure 5:
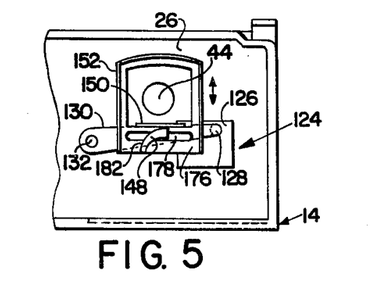
FIG. 5 is an elevational view of selected trim control components and the sensor switch actuator shown in a print lighten position.
Figure 6:
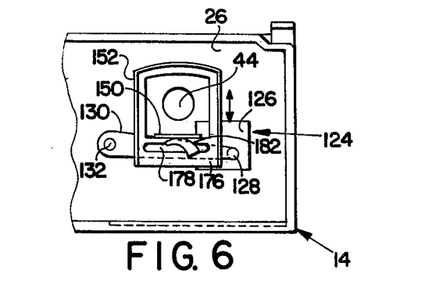
FIG. 6 is an elevational view similar in some respects to FIG. 5 but showing the sensor switch actuator in a print darken position.

As best shown in FIGS. 4, 5 and 6, the trim cam 148 is configured so that it urges coupling frame 152 vertically upwardly in its channel in response to counterclockwise pivotal movement of filter wedge 104 about its pivot pin 146 and allows the frame 152 to move vertically downwardly in its channel under the influence of spring 184 in response to clockwise pivot movement of filter wedge 104.

As frame 152 is moved upwardly from its neutral trim position of FIG. 4, it pivots switch actuator arm 130 in a counterclockwise direction about pin 132 thereby moving contact 128 upwardly relative to neutral line 190 and into a print lighten zone between line 190 and a parallel horizontal line 192 passing through the upper terminal point 194 of indicator edge 134 (see FIGS. 5 and 9) Conversely as frame 112 is moved downwardly it pivots arm 130 in a clockwise direction about pin 132 to move contact 128 downwardly relative to line 190 into a print darken zone bounded by line 190 and a parallel horizontal line 196 passing through the lower terminal point 198 of indicator edge 134 (see FIGS. 6 and 9).

The locus of movement of contact 128 (shown as dotted circles in FIG. 9) in response to the pivotal movement of trim filter 104 defines a second sensor path of travel that intersects with and is transversely disposed with respect to the first sensor path along line 190. Although the second path is illustrated as being a large radius arc crossing line 190 due to the pivotal motion of arm 130 the departure from a vertical straight line second sensor path that crosses line 190 at right angles is very slight and for the sake of this disclosure it may be thought of as such a linear path of travel that sets the Y coordinate of contact 128 in relation to the oblique indicator edge 134. Also it is within the scope of the present invention to provide a mounting system for contact 128 wherein it does move on a second sensor path that is at 90° to the first path (line 190) and is disposed, along with the first path, at an oblique angle of 45° with respect to edge 134.

As best shown in FIGS. 5 and 9, when contact 128 is advanced upwardly along the second sensor path of travel into the print lighten zone, its horizontal spacing with respect to a point on edge 134 on the same horizontal increases progressively as contact 128 is displaced further along the second path towards line 192. As the horizontal distance from contact 128 to edge 134 increases the amount of blade movement required to actuate switch 124 by pulling blade 52 out of its insulating position increases thereby increasing the exposure aperture defined by blades 52 and 54 at the point of switch actuation.

Because the light output of the flash source is of known constant intensity and the exposure interval or time is generally fixed in the flash mode of operation (although it could be variable in hybrid shutters), an increase in exposure aperture causes a corresponding increase in exposure value. That is, when contact 128 is in the lighten zone the film is overexposed in relation to the "normal" exposure value provided when contact 128 is on line 190. An overexposed negative in turn causes the production of a lightened positive print therefrom. Because of the oblique relationship of edge 134 with the second path of travel, the amount of overexposure increases as distance between contact 128 and edge 134 increases in the print lighten zone.

Conversely, as best shown in FIGS. 6 and 9, when contact 128 is advanced downwardly along the second sensor path from the neutral position of FIG. 4 into the print darken zone, the horizontal spacing between contact 128 and a point on oblique indicator edge 134 progressively decreases with increasing departure from line 190. In this case the blades 52 and 54 set progressively smaller exposure apertures at the point of switch actuating pull out by blade 52 thereby causing underexposure of the film which results in a darkening of the positive print produced therefrom.

In FIGS. 4, 5 and 6, only the trim adjust wheel 158, arm coupling frame 152 and the cam 148 on wedge 104 of trim assembly 24 are shown for visual clarity.

The illustrated embodiment is a unitary trim system. That is, the trimming function is carried out in both the ambient light and flash illumination mode by rotating wheel 158. In the ambient mode trim is provided by pivoting the filter wedge 104 across the photocell optical path and in the flash mode by positioning the contact 128 along the second sensor path in response to pivoting wedge 104 by the interaction of cam 148, frame 152 and arm 130.

By means of the meshed connection of wheel 158 with wedge 104 it will be seen that rotating wheel 158 in a clockwise direction about its axis will cause wedge 104 to pivot in a counterclockwise direction thereby bringing a more optically dense portion of wedge 104 into the photocell optical path and at the same time moves arm 130 and contact 128 thereon upwardly along the second path of travel thereby causing the exposure response of system 10 to change and produce a lighter print. Conversely rotating wheel 158 in a counterclockwise direction causes wedge 104 to pivot in a clockwise direction to produce the opposite effect. A less dense portion of the wedge 104 is aligned with the photocell path and the contact 128 is moved downwardly along the second sensor path thereby changing the exposure response of the system to produce a darker print.

Thus in the flash mode the effective exposure aperture set by the blades 52 and 54 depends on how far along the blade path the blades 52 and 54 travel from the blocking position toward the unblocking position before they are stopped incidental to flash firing by the interaction of at least one of the blades (blade 52) with the blade position sensing means in the form of switch 124. It has been shown that effective exposure aperture is determined by the position of the switch contact 128 of switch 124 relative to the oblique indicator edge 134 and that the contact 128 is positioned or moved along the first and second sensor paths by the combined and independent inputs of the follow focus and trim control systems.

Prior to describing the electronic control system and the detailed operation of exposure control system 10, it should be noted that system 10 may be configured for use in a direct viewing camera wherein objective lens 50 is not part of the viewing system, and the blades 52 and 54 are normally in the light blocking position and are opened to initiate exposure and are closed to terminate exposure or, alternatively, system 10 may be configured for use in a single lens reflex camera wherein the blades are normally open for viewing and then are closed to prepare for exposure followed by a normal exposure phase and after which the blades are opened once again for viewing.

One example of the type of reflex camera with which system 10 may be used is described in U.S. Pat. No. 3,820,128. In this camera various operational events, in addition to the exposure phase, occur during a single photographic cycle. For example, during a pre-exposure phase, the control components of the camera closed the normally open shutter aperture blades and relocate the camera's reflex mirror. Additionally, during a post-exposure phase, the camera advances a self-developing film unit from the focal plane for processing and resets the camera for viewing by relocating the reflex mirror and once again opening the shutter aperture blades.

Inasmuch as exposure control system 10 of the instant invention is also applicable to cameras other than the single lens reflex type and in any case is particularly directed to operation during the exposure phase, the camera's control system will be described with reference to FIG. 8 without regard to operational events, other than lens focusing and trimming the exposure response, which will occur before or after the completion of exposure.

Figure 8:
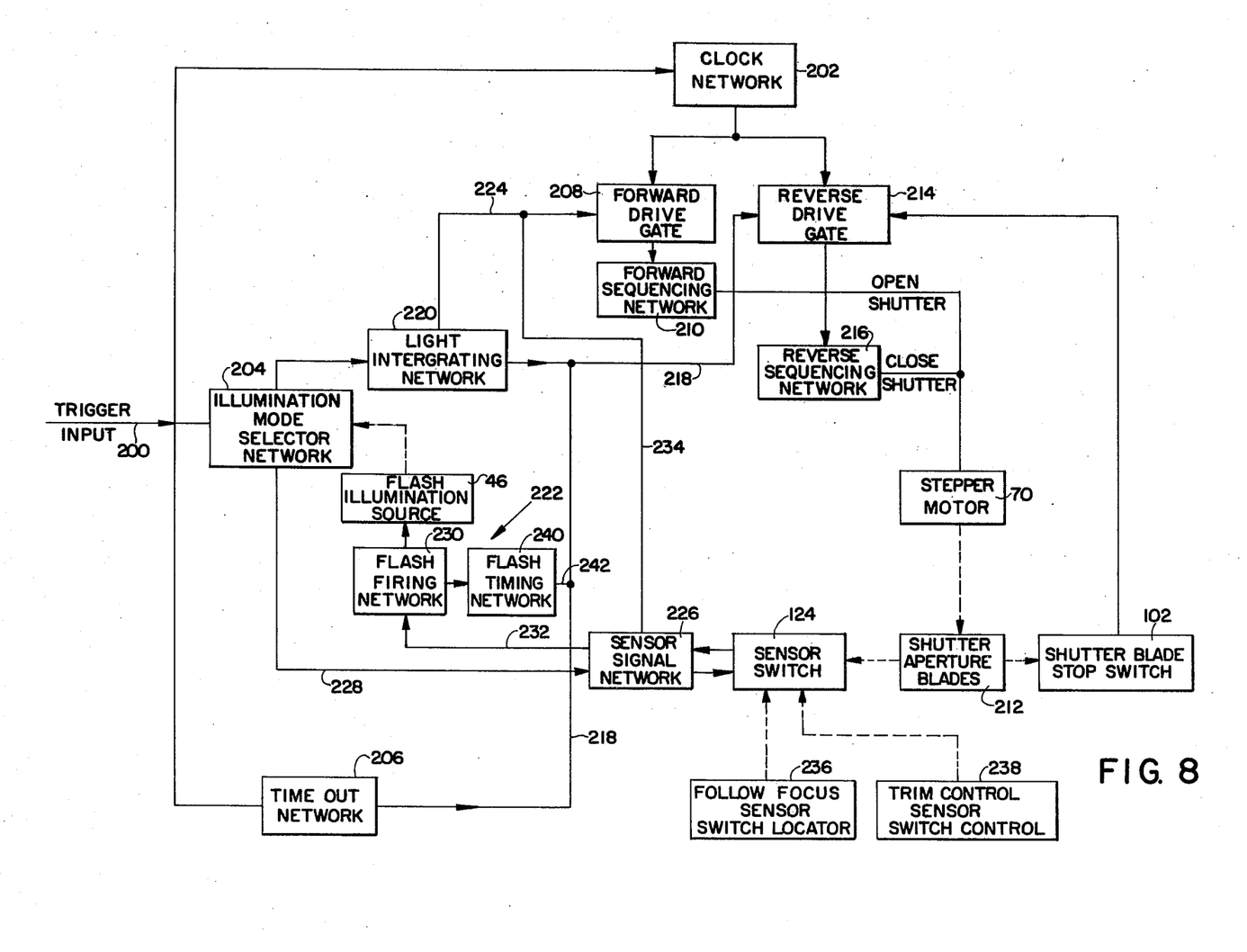
FIG. 8 is a block diagram representation of the electronic and mechanical control logic system for the exposure control system.

Consequently, while in a single lens reflex camera the actual start of the exposure phase often will be derived from a particular operational event occurring in the preexposure phase, it is herein shown in FIG. 8 simply as a trigger signal on input line 200 which can be delivered directly from the illustrated start switch assembly 22 or from any other operational event preceding the actual exposure phase.

The trigger signal is shown passing to a variety of networks including a clock network 202, an illumination mode selector network 204 and a time-out network 206.

Upon triggering clock network 202, it produces timing pulses passing through a forward drive gate 208 to a forward sequencing network 210 which energizes the stepper motor 70 in a sequence designed to displace the shutter aperture blades 52 and 54, designated in FIG. 8 by block 212, in an opening direction to provide progressively enlarging aperture values.

The shutter aperture blades 52 and 54 are subsequently closed by means of timing pulses passing from clock network 202 through a reverse drive gate 214 and reverse sequencing network 216 to motor 70. As explained below, reverse drive gate 214 is triggered into operation by a close shutter signal received on line 218 from either a light-integrating network 220 or a flash network generally designated 222.

For the sake of clarity, the sequencing circuits or networks 210 and 216 are shown as separate networks which would each comprise a series of flip-flop circuits or the like interconnected to deliver the clock pulses to motor 70 in a conventional manner to drive motor 70 in forward or reverse direction. Preferably, these sequencing networks would be combined in a single network with gates 208 and 214 and include flip-flop circuits which are switched from forward to reverse order upon reception of appropriate signals. It should also be noted that the clock pulses from clock network 202 are passed through reverse drive gate 214 to reverse sequencing network 216 so that the operation of the latter is also functionally related to the shutter blade stop switch 102. In this arrangement the reverse drive gate 214 is held closed or non-conducting when the blades 52 and 54 are in their closed position so that the motor drive operation for the exposure phase must always start in the blade opening direction to be followed subsequently by a closing operation.

Referring once again to the trigger input signal on input line 200, it should be noted that it is conducted to time out network 206 comprising a simple delay circuit which after a suitable delay in excess of the expected maximum exposure interval provides a signal on line 218 to reverse the motor drive thereby closing the shutter and, in effect, providing a fail-safe feature to terminate the exposure phase.

Under normal conditions, however, the exposure phase is completed by either the light-integrating network 220 or the flash network 222, one of which is selected for operation by the illumination mode selector network 204. The latter is responsive to reception of the flash source 46 in socket assembly 16 and it may take the form of a switch and latching circuit arrangement which, in response to insertion of flash source 46 into socket assembly 16, arms the flash network 222 and disarms or disenables the light-integrating network 220 so as to program the camera for the flash illumination mode of operation.

Prior to describing the flash illuminated mode of operation to which the present invention is primarily directed, the overall exposure control circuit will be described with regard to ambient light operation.

In the ambient light mode, as the shutter aperture blades 52 and 54 open responsive to triggering of clock network 202, the light-integrating network 220, responsive to unblocking the photocell element 40, integrates the received light by means of a charging capacitor (not shown) until a predetermined voltage value is reached, at which time, by means of a trigger circuit (not shown) a trigger pulse is directed along line 218 to the reverse drive gate 214 to render it conductive thereby reversing the pulse sequence so as to close the shutter aperture blades which reset the system for the next cycle of operation.

During the operation of light integrating network 220, a latching signal is also delivered to the forward drive gate 208, by means of line 224, to hold it in its conducting state thereby permitting forward pulse operation.

When the blade closing signal is delivered by light-integrating network 220 over line 218 to reverse drive gate 214, the latching signal to gate 208 is removed thereby stopping the forward drive pulse signals to motor 70 simultaneously with the initiation of the reverse drive pulses.

For low light level ambient conditions, where a fully open exposure aperture operation is employed, a counter (not shown) upon recording a predetermined number of pulse signals, indicating a fully open exposure aperture, stops further application of the forward drive pulses, and the blades 52 and 54 remain in the fully open exposure aperture configuration until the close shutter signal is received by reverse drive gate 214 from light-integrating network 220 or, alternatively, from time-out network 206 if the exposure interval reaches the programmed time interval of network 206 before the predetermined voltage is reached by network 220.

In the artificial or flash illumination mode of operation, which is automatically selected by inserting the flash illumination source 46 into the flash socket assembly 16 that forms part of illumination mode selector network 204, the trigger input signal on line 200 causes network 204 (now in the flash mode) to activate the flash network 222 by energizing a sensor signal network 226 over line 228. Network 226 is electrically coupled to sensor switch 124, a flash firing network 230 over line 232 and the forward drive gate 208 over line 234 that is connected to forward drive gate input line 224.

As noted earlier, the sensor switch 124, formed by contact 126 on rear wall 26 of support member 14 and contact 128 on the movably mounted actuator arm 130, is configured to sense the position of the blade 52 by means of its interaction with indicator edge 134 on blade 52 and provide an output signal when edge 134 is in a predetermined vicinity of switch to thereby halt or interrupt the forward drive pulse signals provided from clock network 202 to stepper motor 70 through gate 208 and network 210.

When the blades 52 and 54 are located in the closed or light-blocking position just prior to the initiation of the exposure phase, an electrically insulating portion of blade 52 is located between the contacts 126 and 128 of switch 124 holding it in its non-conducting open position until the portion of blade 52 is withdrawn therefrom. The actuator portion of switch 124, namely, contact 128 on arm 130, is advanced along the first sensor path of travel by operation of the follow-focus system, designated follow-focus sensor switch locator block 236, to set the switch contact 128 in accordance with the focus distance set for lens 50 and is advanced along the second sensor path that intersects with and is transversely disposed relative to the first sensor path by operation of the trim control system designated trim control sensor switch locator block 238. The combined mechanical inputs of blocks 236 and 238 cooperate to set the position of sensor switch contact 128 in relation to the indicator edge 134 on blade 52 so that blades 52 and 54 will define an appropriate aperture value selected for the indicated subject distance and trim control adjustment.

In response to the energization of sensor signal network 226 it continuously monitors the condition of switch 124. If switch is open, indicating that the blade portion is between contacts 126 and 128, network 226 provides a signal over lines 234 and 224 to gate 208 keeping it in its conducting state so that forward drive (shutter opening) pulses are passed to motor 70 through network 210. The motor 70 drive blades 52 and 54 open establishing progressively increasing aperture values until the portion of blade 52 is pulled out from its insulating position causing the contacts 126 and 128 to close and conduct thereby providing an output signal back to sensor signal network 226. In response to the output signal from switch 124, network 226 discontinues the gate conduct signal to gate 208 thereby turning it off and stopping motor 70 and its displacement of the blades which are now in a position to define the exposure aperture value preselected by the setting of the position of contact 128. At the same time, sensor signal network 226 provides an actuating signal over line 232 to the flash firing network 230 which provides flash bulb selection and firing signals to the multilamp flash bar 46 and an activating signal to flash timing network 240. After an appropriate time delay related to the duration of the flash illumination, flash timing network 240 provides a signal to reverse drive gate 214, over lines 242 and 218, which switches to its conductive state allowing clock pulses from network 202 to pass through gate 214 and reverse sequencing network 216 to operate motor 70 in its reverse direction to drive blades 52 and 54 to the closed light blocking position wherein the end of shutter blade 52 actuates shutter blade stop switch 102 turning off gate 214 to stop motor 70 and terminate the exposure phase of the cycle of camera operation.

In the illustrated embodiment of the present invention, the follow focus and trim control arrangement employs a sensor switch that is held in its open non-conductive state at the initiation of the exposed phase by the portion of insulating blade 52 located between sensor switch contacts 126 and 128. In operation the switch 124 is closed when the indicator edge 134 becomes disengaged from contacts 126 and 128 and provides an output signal that causes the stopping of opening blade displacement incidental to firing the flash source 46. However, other switch actuating arrangements may be used without departing from the scope of the present invention. For example, the blade 52 and switch 124 may be configured so that the sensor switch contacts are engaged or closed when the blades 52 and 54 are in the light blocking position and the output signal is provided when an oblique indicator edge provided on blade 52 is inserted between these contacts as the blades are displaced towards the unblocking position to open switch 124. Also switch 124 may comprise the contact 128 as shown and another contact pad (not shown) carried on blades 52 or 54 which will make contact with contact 128 to close switch 124 in response to blade displacement toward the unblocking position.

Also it should be noted that while the aperture setting device has been described in terms of follow focus and trim control mechanism, it may be used with any type of ranging and trim system or may be used with other devices for providing adjustment of any two exposure parameters that affect the exposure response of exposure control system 10.

Those familiar with the photographic art will readily appreciate the novel and unique advantages of this invention which provides a simple and economical arrangement, having a design that favors assembly by automatic machine, for selecting aperture value as a function of both scene ranging and trimming for modifying the preprogrammed "normal exposure" response of the exposure control system. More particularly, the present invention locates a switch contact at a location relative to an oblique indicator edge on one of the shutter-aperture blades by selective movement along a first sensor path in accordance with the lens focus distance setting and along a second sensor path, intersecting and transversely disposed with respect to the first path in response to operator selected exposure trim whereby these two combined contact positional inputs locate the contact at a predetermined location with respect to the blade indicator so as to determine the corresponding exposure aperture selected by such a contact position.

Further, it can be readily appreciated that this invention may be embodied or practiced in still other ways without departing from the scope or essential character thereof. Therefore, the embodiments described herein is illustrative and not restrictive, the scope of the invention being indicated by the following claims, and all inventions which come within the meaning of these claims are intended to be embraced therein.

What is claimed is:

1. An improved exposure control system for regulating the transmission of image-carrying light rays from a scene along an optical path to a photographic film unit located at a given focal plane, said exposure control system being of the type including at least one blade member; means for mounting said blade member for displacement along a given blade path of travel between first and second positions, said blade member being configured to block the optical path when located in its said first position and unblock the optical path when located in its said second position and to provide progressively changing aperture values within a given range of aperture values through which scene light may pass to the given focal plane as said blade member is displaced from said first position, each of said aperture values being in correspondence with a respective position of said blade member along said blade path of travel; sensor means for determining when said blade means has reached a predetermined position along said blade path of travel; said sensor means including a sensor having an actuator portion and providing a given output signal when said blade member is displaced from said first position to within a predetermined vicinity of said actuator portion; means for mounting at least said actuator portion for displacement along a first sensor path of travel at least substantially parallel to said blade path of travel; aperture selecting means for selecting an aperture value in correspondence with the distance to the scene to be photographed and for displacing at least said actuator portion to a predetermined location along said first sensor path of travel in accordance with said selected aperture value; drive means being operative for displacing said blade member between its said first and second positions; and actuating means for activating said drive means to displace said blade member from its first position toward its second position to initiate an exposure interval during which scene light is directed to the given focal plane and for then at least temporarily terminating further activation of said drive means so as to interrupt said displacement of said blade member in response to said given output signal provided by said sensor to thereby select an aperture value in operative relation to the optical path in accordance with the location of said actuator portion along said first path of travel of said sensor wherein the improvement comprises:

means for mounting at least said actuator portion of said sensor for displacement along a second sensor path of travel intersecting said first sensor path of travel and being disposed in substantially transverse relation thereto so that said actuator portion may be displaced along either one of said first or second sensor paths independently of its displacement along the other of said first and second sensor paths;

aperture trim means being operative independently of the operation of said aperture selecting means for displacing said actuator portion along said second path of travel to move said actuator portion from said predetermined location along said first sensor path of travel to make adjustment in the aperture value set by operation of said aperture selecting means;

indicator means on said blade member cooperating directly with said actuator portion for providing an indication to said actuator portion that said blade member is located within said predetermined vicinity of said actuator portion, said indicator means being configured to provide said indication at different positions of said blade member along said blade path of travel in accordance with the location of said actuator portion defined by its position along said first sensor path of travel in combination with its position along said second sensor path of travel; and said sensor including an electrical switch having first and second contacts, said sensor actuator portion including one of said first and second contacts and said blade member including an electrically insulative portion thereof that is positioned in between said first and second contacts when said blade member is in said blocking position to maintain said switch in its nonconducting state and said insulative portion of said blade member being removed from its insulating position in response to displacement of said blade member from its blocking position toward its unblocking position thereby allowing engagement of said first and second contacts to causing said switch to assume its conducting state and provide said given output signal to said actuating means.

2. The improved exposure control system of claim 1 wherein said indicator means includes an indicator edge of said insulative portion of said blade member, said indicator edge being disposed at an oblique angle with respect to said first and second sensor paths of travel and said predetermined vicinity of said blade member with respect to said actuator portion is defined as that point along said blade path of travel toward said unblocking position at which said indicator edge is displaced sufficiently from its insulative position to allow engagement of said first and second contacts.

3. An improved exposure control system for regulating the transmission of image-carrying light rays from a scene along an optical path to a photographic film unit located at a given focal plane, said exposure control system being of the type including at least one blade member; means for mounting said blade member for displacement along a given blade path of travel between first and second positions, said blade member being configured to block the optical path when located in its said first position and unblock the optical path when located in its said second position and to provide progressively changing aperture values within a given range of aperture values through which scene light may pass to the given focal plane as said blade member is displaced from said first position, each of said aperture values being in correspondence with a respective position of said blade member along said blade path of travel; sensor means for determining when said blade means has reached a predetermined position along said blade path of travel; said sensor means including a sensor having an actuator portion and providing a given output signal when said blade member is displaced from said first position to within a predetermined vicinity of said actuator portion; means for mounting at least said actuator portion for displacement along a first sensor path of travel at least substantially parallel to said blade path of travel; aperture selecting means for selecting an aperture value in correspondence with the distance to the scene to be photographed and for displacing at least said actuator portion to a predetermined location along said first sensor path of travel in accordance with said selected aperture value; drive means being operative for displacing said blade member between its said first and second positions; and actuating means for activating said drive means to displace said blade member from its first position toward its second position to initiate an exposure interval during which scene light is directed to the given focal plane and for then at least temporarily terminating further activation of said drive means so as to interrupt said displacement of said blade member in response to said given output signal provided by said sensor to thereby select an aperture value in operative relation to the optical path in accordance with the location of said actuator portion along said first path of travel of said sensor wherein the improvement comprises:

means for mounting at least said actuator portion of said sensor for displacement along a second sensor path of travel intersecting said first sensor path of travel and being disposed in substantially transverse relation thereto so that said actuator portion may be displaced along either one of said first or second sensor paths independently of its displacement along the other of said first and second sensor paths;

aperture trim means being operative independently of the operation of said aperture selecting means for displacing said actuator portion along said second path of travel to move said actuator portion from said predetermined location along said first sensor path of travel to make adjustment in the aperture value set by operation of said aperture selecting means; and indicator means on said blade member cooperating directly with said actuator portion for providing an indication to said actuator portion that said blade member is located within said predetermined vicinity of said actuator portion, said indicator means being configured to provide said indication of different positions of said blade member along said blade path of travel in accordance with the location of said actuator portion defined by its position along said first sensor path of travel in combination with its position along said second sensor path of travel, said indicator means including an indicator portion of said blade member disposed at an oblique angle with respect to both of said first and second sensor paths of travel.

4. The improved exposure control system of claim 3 wherein said first and second sensor paths of travel are disposed in substantially perpendicular relationship to each other and said indicator means is disposed at an oblique angle of approximately 45° with respect to said first and second sensor paths of travel.

5. The improved exposure control system of claim 3 wherein said indicator portion includes an edge of said blade member disposed at said oblique angle with respect to said first and second sensor paths of travel and said blade path of travel.

6. An improved exposure control system for regulating the transmission of image-carrying light rays from a scene along an optical path to a photographic film unit located at a given focal plane, said exposure control system being of the type including at least one blade member; means for mounting said blade member for displacement along a given blade path of travel between first and second positions, said blade member being configured to block the optical path when located in its said first position and unblock the optical path when located in its said second position and to provide progressively changing aperture values within a given range of aperture values through which scene light may pass to the given focal plane as said blade member is displaced from said first position, each of said aperture values being in correspondence with a respective position of said blade member along said blade path of travel; sensor means for determining when said blade means has reached a predetermined position along said blade path of travel; said sensor means including a sensor having an actuator portion and providing a given output signal when said blade member is displaced from said first position to within a predetermined vicinity of said actuator portion; means for mounting at least said actuator portion for displacement along a first sensor path of travel at least substantially parallel to said blade path of travel; aperture selecting means for selecting an aperture value in correspondence with the distance to the scene to by photographed and for displacing at least said actuator portion to a predetermined location along said first sensor path of travel in accordance with said selected aperture value; drive means being operative for displacing said blade member between its said first and second positions; and actuating means for activating said drive means to displace said blade member from its first position toward its second position to initiate an exposure interval during which scene light is directed to the given focal plane and for then at least temporarily terminating further activation of said drive means so as to interrupt said displacement of said blade member in response to said given output signal provided by said sensor to thereby select an aperture value in operative relation to the optical path in accordance with the location of said actuator portion along said first path of travel of said sensor wherein the improvement comprises:

means for mounting at least said actuator portion of said sensor for displacement along a second sensor path of travel intersecting said first sensor path of travel and being disposed in substantially transverse relation thereto so that said actuator portion may be displaced along either one of said first or second sensor paths independently of its displacement along the other of said first and second sensor paths;

aperture trim means being operative independently of the operation of said aperture selecting means for displacing said actuator portion along said second path of travel to move said actuator portion from said predetermined location along said first sensor path of travel to make adjustment in the aperture value set by operation of said aperture selecting means;

indicator means on said blade member cooperating directly with said actuator portion for providing an indication to said actuator portion that said blade member is located within said predetermined vicinty of said actuator portion, said indicator means being configured to provide said indication at different positions of said blade member along said blade path of travel in accordance with the location of said actuator portion defined by its position along said first sensor path of travel in combination with its position along said second sensor path of travel; and said sensor including an electrical switch having first and second contacts, said sensor actuator portion including one of said first and second contacts, and said blade member including an electrically insulative portion that is positioned to one side of said first and second contacts when said blade member is in said blocking position so that said first and second contacts are in engagement causing said switch to assume its conductive state and said insulative portion of said blade member being adapted to be driven in between said first and second contacts to an insulating position causing said first and second contacts to become disengaged in responsive to displacement of said blade member towards said unblocking position whereby said switch assumes its nonconducting state and thereby provides said given output signal to said actuating means.

7. The improved exposure control system of claim 6 wherein said indicator means includes an indicator edge of said insulative portion of said blade member, said indicator edge being disposed at an oblique angle with respect to said first and second sensor paths of travel and said predetermined vicinity of said blade member with respect to said actuator portion is defined as that point along said blade path of travel at which said indicator edge is driven in between said first and second contacts sufficiently to cause said first and second contacts to become disengaged.

8. An improved exposure control system for regulating the transmission of image-carrying light rays from a scene along an optical path to a photographic film unit located at a given focal plane, said exposure control system being of the type including at least one blade member; means for mounting said blade member for displacement along a given blade path of travel between first and second positions, said blade member being configured to block the optical path when located in its said first position and unblock the optical path then located in its said second position and to provide progressively changing aperture values within a given range of aperture values through which scene light may pass to the given focal plane as said blade member is displaced from said first position, each of said aperture values being in correspondence with a respective position of said blade member along said blade path of travel; sensor means for determining when said blade means has reached a predetermined position along said blade path of travel; said sensor means including a sensor having an actuator portion and providing a given output signal when said blade member is displaced from said first position to within a predetermined vicinity of said actuator portion; means for mounting at least said actuator portion for displacement along a first sensor path of travel at least substantially parallel to said blade path of travel; aperture selecting means for selecting an aperture value in correspondence with the distance to the scene to be photographed and for displacing at least said actuator portion to a predetermined location along said first sensor path of travel in accordance with said selected aperture value; drive means being operative for displacing said blade member between its said first and second positions; and actuating means for activating said drive means to displace said blade member from its first position toward its second position to initiate an exposure interval during which scene light is directed to the given focal plane and for then at least temporarily terminating further activation of said drive means so as to interrupt said displacement of said blade member in reponse to said given output signal provided by said sensor to thereby selct an aperture value in operative relation to the optical path in accordance with the location of said actuator portion along said first path of travel of said sensor wherein the improvement comprises:

means for mounting at least said actuator portion of said sensor for displacement along a second sensor path of travel intersecting said first sensor path of travel and being disposed in substantially transverse relation thereto so that said actuator portion may be displaced along either one of said first or second sensor paths independently of its displacement along the other of said first and second sensor paths;

aperture trim means being operative independently of the operation of said aperture selecting means for displacing said actuator portion along said second path of travel to move said actuator portion from said predetermined location along said first sensor path of travel to make adjustment in the aperture value set by operation of said aperture selecting means; and indicator means on said blade member cooperating directly with said actuator portion for providing an indication to said actuator portion that said blade member is located within said predetermined vicinity of said actuator portion, said indicator means being configured to provide said indication at different positins of said blade member along said blade path of travel in accordance with the location of said actuator portion defined by its position along said first sensor path of travel in combination with its position along said second sensor path of travel, said indicator means including an indicator edge of said blade member being disposed at an oblique angle with respect to first and second sensor paths of travel such that said indicator edge interacts with said actuator portion to provide said given output signal at a given blade aperture value when said actuator portion is located at a given position along said first sensor path of travel at a point of intersection with said second sensor path of travel, to provide said given output signal at a blade aperture value smaller than said given blade aperture value when said actuator portion is at a location along said second sensor path of travel to one side of said point of intersection with said first sensor path of travel and to provide said given output signal at a blade aperture value greater than said given blade aperture value when said actuator portion is at a location along said second sensor path of travel on the opposite side of said point of intersection with said first sensor path of travel.

9. The improved exposure control system of claim 8 wherein said blade aperture value at which said given output signal is provided varies in accordance with the distance said actuator is displaced along said second sensor path of travel from said point of intersection with said first sensor path of travel.

* * * * *